(12) United States Patent
Kuribara

(10) Patent No.: US 9,311,037 B2
(45) Date of Patent: Apr. 12, 2016

(54) IMAGE FORMING APPARATUS AND IMAGE FORMING SYSTEM

(71) Applicant: Oki Data Corporation, Tokyo (JP)

(72) Inventor: Nobuhiro Kuribara, Tokyo (JP)

(73) Assignee: OKI DATA CORPORATION, Tokyo (JP)

( * ) Notice: Subject to any disclaimer, the term of this patent is extended or adjusted under 35 U.S.C. 154(b) by 0 days.

(21) Appl. No.: 14/481,870

(22) Filed: Sep. 9, 2014

(65) Prior Publication Data

US 2015/0070719 A1     Mar. 12, 2015

(30) Foreign Application Priority Data

Sep. 10, 2013   (JP) .................................. 2013-187438

(51) Int. Cl.
  *G06K 15/00*     (2006.01)
  *G06F 3/12*     (2006.01)

(52) U.S. Cl.
  CPC ............ *G06F 3/1288* (2013.01); *G06F 3/1203* (2013.01); *G06F 3/126* (2013.01); *G06F 3/1222* (2013.01); *G06F 3/1287* (2013.01); *G06F 3/1292* (2013.01); *G06F 3/1238* (2013.01); *G06F 3/1267* (2013.01)

(58) Field of Classification Search
  CPC ..... G06F 3/1288; G06F 3/1204; G06F 3/126; G06F 3/1285
  USPC .................................................. 358/1.1–3.31
  See application file for complete search history.

(56) References Cited

U.S. PATENT DOCUMENTS

| 2002/0105671 | A1* | 8/2002 | Sugahara ...................... 358/1.15 |
| 2013/0003127 | A1* | 1/2013 | Berglin ................. G06F 3/1205 358/1.15 |
| 2013/0027741 | A1  | 1/2013 | Liu |
| 2013/0050735 | A1* | 2/2013 | Nuggehalli ........... G06F 3/1203 358/1.13 |
| 2013/0163031 | A1* | 6/2013 | Tanaka ......................... 358/1.14 |

FOREIGN PATENT DOCUMENTS

JP   2008-146465 A   6/2008

* cited by examiner

*Primary Examiner* — Marcellus Augustin
(74) *Attorney, Agent, or Firm* — Rabin & Berdo, P.C.

(57) ABSTRACT

An image forming apparatus includes: a communication unit that communicates with a print server, the print server providing, when the image forming apparatus is registered with the print server, a service of receiving and storing a print job for the image forming apparatus and sending the stored print job to the image forming apparatus, the communication unit receiving the print job sent from the print server; a printing unit that prints the print job received by the communication unit; a reception unit that receives an instruction to remove the registration of the image forming apparatus; and a controller that, when the reception unit receives the instruction, sends, via the communication unit to the print server, a request to send the print job, and then sends, via the communication unit to the print server, a request to remove the registration of the image forming apparatus from the print server.

20 Claims, 9 Drawing Sheets

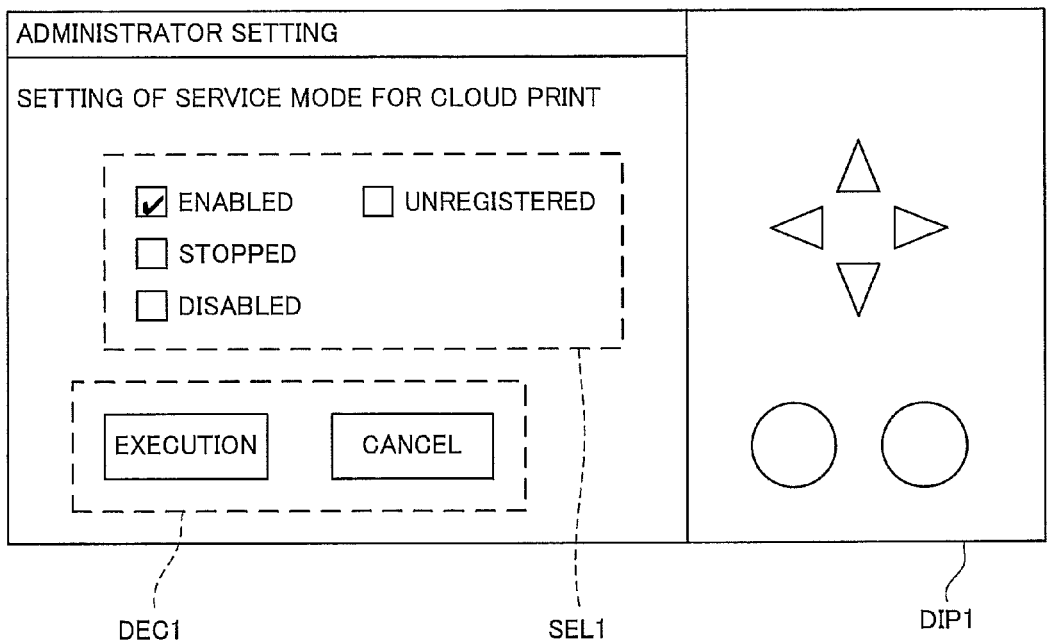
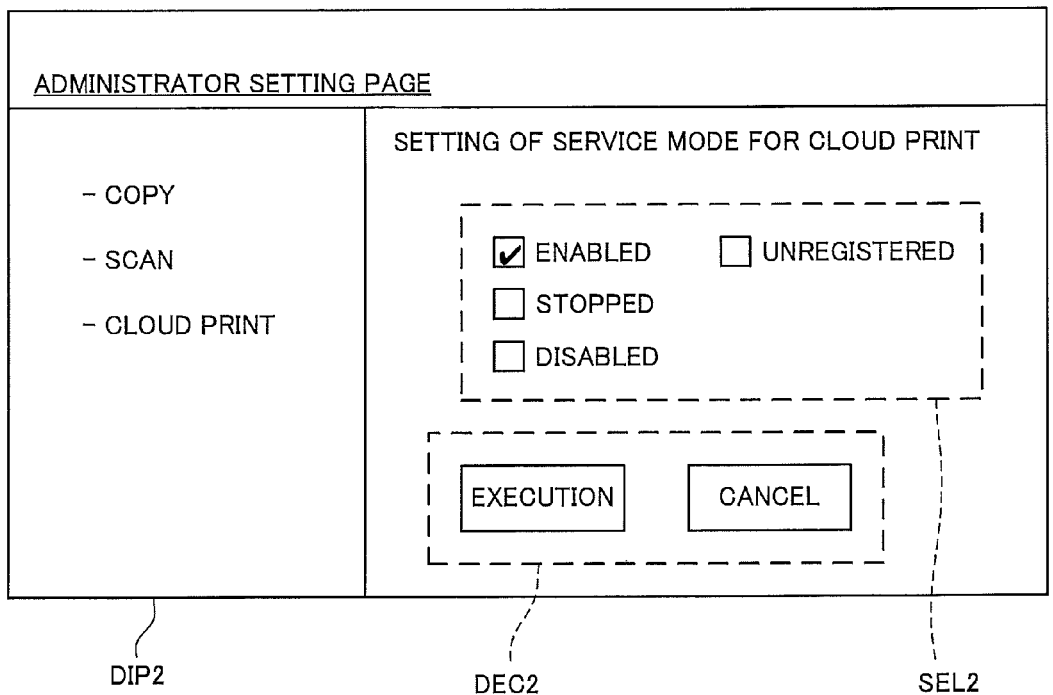

FIG.7

```
                                                              JL
{
"JOB ID" : "12345",
"FILE NAME" : "test1.pdf",
"STATUS" : "Waiting",
"PRINT DATA STORAGE LOCATION" : "http://printing/download?xyzxyz",
"PRINT SETTING STORAGE LOCATION" : "http://printing/output?xxxyyyzzz"
}
{
"JOB ID" : "6789"
"FILE NAME" : "test2.pdf",
"STATUS" : "Waiting",
"PRINT DATA STORAGE LOCATION" : "http://printing/download?abcabc",
"PRINT SETTING STORAGE LOCATION" : "http://printing/output?aaabbbccc"
}
```

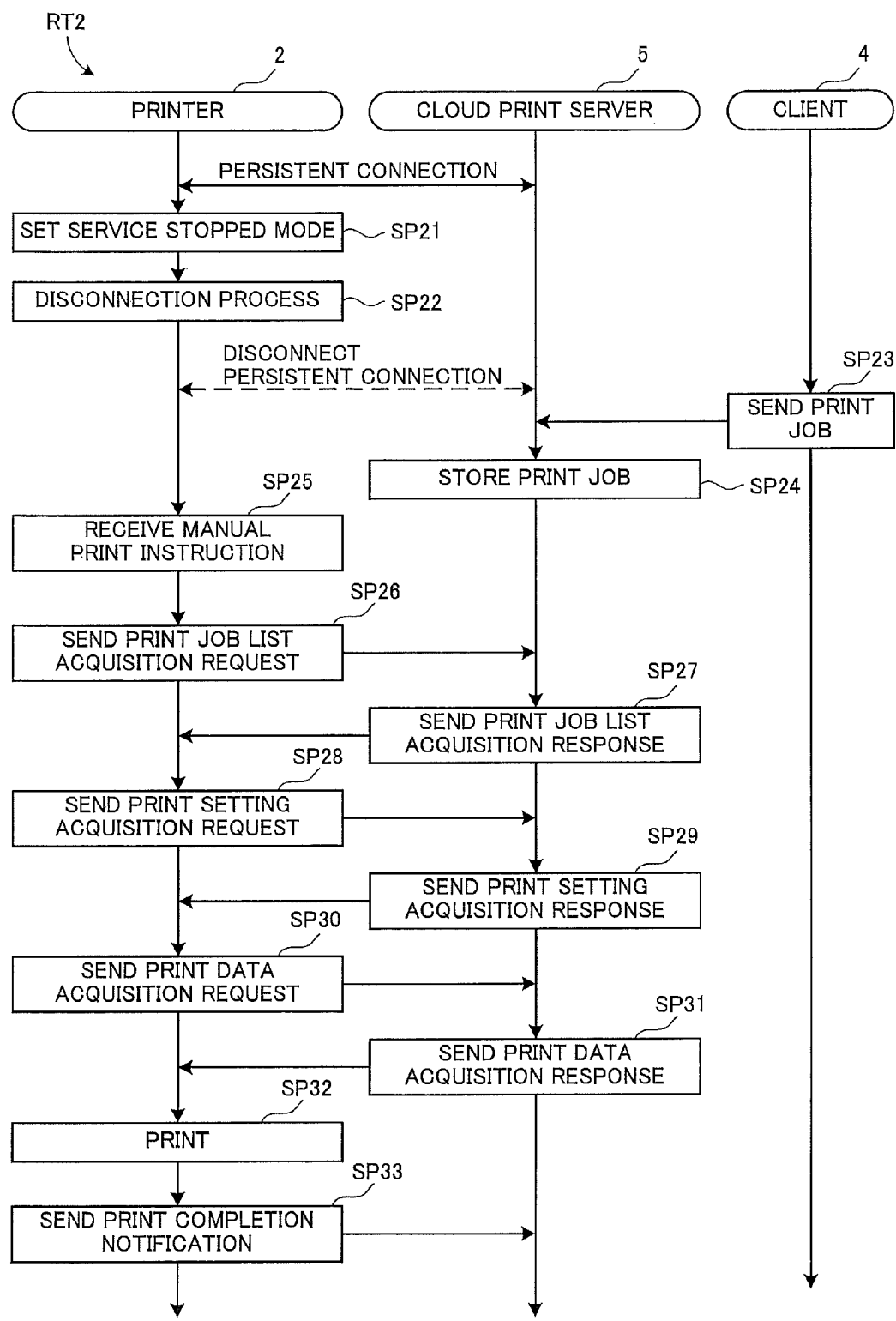

IMAGE FORMING APPARATUS AND IMAGE FORMING SYSTEM

BACKGROUND OF THE INVENTION

1. Field of the Invention

The present invention relates to an image forming apparatus and an image forming system.

2. Description of the Related Art

A print system has been proposed in which a client sends a print job to a server via the Internet, the server sends the print job to a printer via the Internet, and the printer performs printing based on the print job (for example, see Japanese Patent Application Publication No. 2008-146465).

SUMMARY OF THE INVENTION

An aspect of the present invention is intended to improve the reliability of a print system.

According to an aspect of the present invention, there is provided an image forming apparatus including: a communication unit that communicates with a print server, the print server providing, when the image forming apparatus is registered with the print server, a service of receiving and storing a print job for the image forming apparatus and sending the stored print job to the image forming apparatus, the communication unit receiving the print job sent from the print server; a printing unit that prints the print job received by the communication unit; a reception unit that receives an instruction to remove the registration of the image forming apparatus; and a controller that, when the reception unit receives the instruction, sends, via the communication unit to the print server, a request to send the print job, and then sends, via the communication unit to the print server, a request to remove the registration of the image forming apparatus from the print server.

According to an another aspect of the present invention, there is provided an image forming system including a print server and an image forming apparatus. The print server provides, when the image forming apparatus is registered with the print server, a service of receiving and storing a print job for the image forming apparatus and sending the stored print job to the image forming apparatus. The image forming apparatus includes: a communication unit that communicates with the print server, the communication unit receiving the print job sent from the print server; a printing unit that prints the print job received by the communication unit; a reception unit that receives an instruction to remove the registration of the image forming apparatus; and a controller that, when the reception unit receives the instruction, sends, via the communication unit to the print server, a request to send the print job, and then sends, via the communication unit to the print server, a request to remove the registration of the image forming apparatus from the print server.

Further scope of applicability of the present invention will become apparent from the detailed description given hereinafter. However, it should be understood that the detailed description and specific embodiments, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the attached drawings:

FIG. 4 is a schematic view illustrating a service mode setting screen on an operation panel;

FIG. 5 is a schematic view illustrating a service mode setting screen of a device web page;

FIG. 7 illustrates a print job list;

FIG. 8 is a sequence chart illustrating a printing process procedure in a service stopped mode;

DETAILED DESCRIPTION OF THE INVENTION

Embodiments of the invention will now be described with reference to the attached drawings.

1. Embodiment

1-1. Configuration of Cloud Print System

Figure 1:
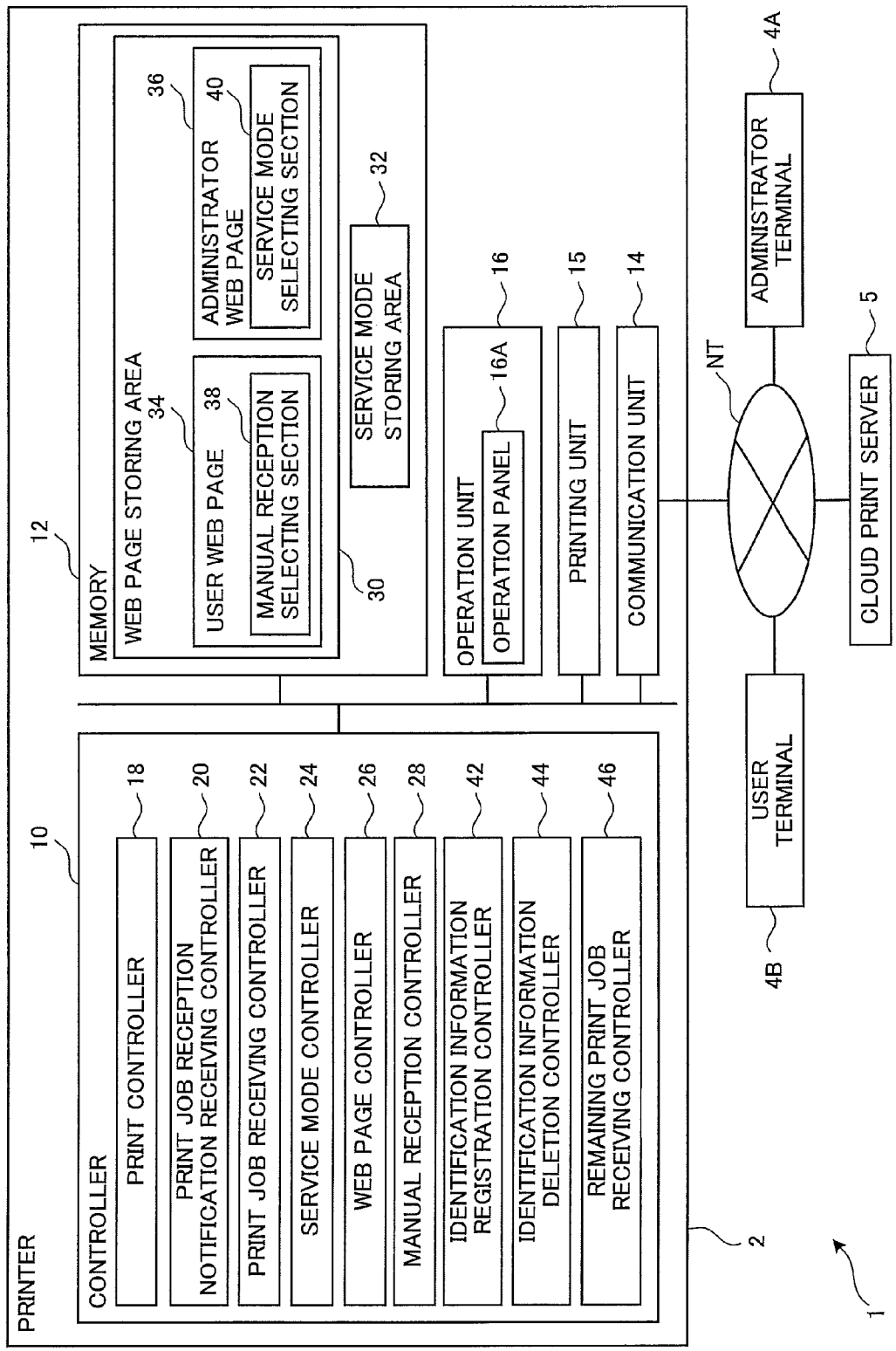
FIG. 1 is a schematic block diagram illustrating a configuration of a cloud print system.

FIG. 1 illustrates a cloud print system 1 as an image forming system in this embodiment. In FIG. 1, the cloud print system 1 includes a printer 2 as an image forming apparatus, a cloud print server 5 as a print server, an administrator terminal 4A as a client of the cloud print server 5, and a user terminal 4B as a client of the cloud print server 5, which are connected to each other via the Internet NT. Hereinafter, when the administrator terminal 4A and user terminal 4B need not be distinguished from each other, each of them will be referred to as a client 4. In the cloud print system 1, a client 4 sends a print job to the cloud print server 5, which sends the print job to the printer 2, which prints the print job.

The cloud print server 5 provides, when the printer 2 is registered with the cloud print server 5, a cloud print service of receiving and storing a print job for the printer 2 and sending the stored print job to the printer 2. Specifically, when the printer 2 is registered, the cloud print server 5 receives a print job for the printer 2 from a client 4, stores the received print job, and sends the stored print job to the printer 2. More specifically, the cloud print server 5 receives, from a client 4 via the Internet NT, a print job with designation of a destination of the print job, stores the received print job, and sends the stored print job via the Internet NT to the designated destination; the printer 2 can be designated as the destination if it is registered with the cloud print server 5, but the printer 2 cannot be designated as the destination if it is not registered with the cloud print server 5. Thus, the cloud print server 5 places the printer 2 in a state in which the printer 2 can be designated as the destination, by registering the printer 2 with the cloud print server 5. In this embodiment, the cloud print server 5 registers the printer 2 by storing or registering identification information for identifying the printer 2 in a predetermined memory. The cloud print server 5 makes the printer 2 available in the cloud print system 1 by registering the identification information for the printer 2 in the memory, and makes the printer 2 unavailable in the cloud print system 1 by deleting the identification information for the printer 2 from the memory. The cloud print service is a service that allows the clients 4 to print a print job at the printer 2 by using the cloud print server 5.

The administrator terminal 4A is a PC (Personal Computer), a mobile terminal, or the like. The administrator terminal 4A is operated by an administrator having authority to manage the settings of the printer 2 in the cloud print service, and accesses the printer 2 via the Internet NT to make settings, such as setting of a service mode (described later), regarding the operation of the printer 2 in the cloud print system 1.

In accordance with operation by the administrator, the administrator terminal 4A sends a print job to the cloud print server 5 while designating, as a destination of the print job, the printer 2 registered with the cloud print server 5.

The user terminal 4B is a PC, a mobile terminal, or the like. The user terminal 4B is operated by an ordinary user having no authority to manage the settings of the printer 2 in the cloud print service, and in accordance with the operation, sends a print job to the cloud print server 5 while designating, as a destination of the print job, the printer 2 registered with the cloud print server 5. Hereinafter, when the ordinary user and administrator need not be distinguished from each other, each of them will be referred to as a user.

When the cloud print server 5 receives the print job from the administrator terminal 4A or user terminal 4B (i.e., client 4), it sends the printer 2 a notification (referred to below as a print job reception notification) indicating that a print job has been received by the cloud print server 5.

When the printer 2 receives the print job reception notification, it acquires or receives the print job from the cloud print server 5 and performs printing based on the print job (i.e., prints the print job). The printer 2 has a function of selecting whether a print job reception notification is sent from the cloud print server 5 or not, and a function of, in accordance with operation of the printer 2 by a user, acquiring a print job from the cloud print server 5 and printing it. These functions will be detailed later.

1-2. Configuration of Printer

The printer 2 includes a controller 10, a memory 12, a communication unit 14, a printing unit 15, and an operation unit (or user interface) 16.

The communication unit 14 sends and receives data to and from the administrator terminal 4A, user terminal 4B, and cloud print server 5 via the Internet NT. The communication unit 14 receives a print job sent from the cloud print server 5. The printing unit 15 prints the print job received by the communication unit 14.

The operation unit 16 includes an operation panel 16A and operation keys (not shown). The operation panel 16A includes an LCD (Liquid Crystal Display) and a touch panel, which are integrally formed. The LCD displays screens, such as various setting screens, under control of the controller 10. The touch panel receives selection regarding various setting items on the setting screens. The operation keys include a copy screen display key, a print screen display key, a scan screen display key, a facsimile screen display key, a start key, a stop/clear key, a power supply key, numeric keys, and the like. The operation unit 16 outputs operation instructions to the controller 10 in response to operation of the operation panel 16A or operation keys. The operation unit 16 serves as a reception unit that receives an instruction (referred to below as a removal instruction) to remove the registration of the printer 2.

The memory 12 may include a ROM (Read Only Memory), a RAM (Random Access Memory), a hard disc drive, a flash memory, or the like. The memory 12 includes a web page storing area 30 and a service mode storing area 32. The web page storing area 30 stores sources of web pages (referred to below as device web pages) in HTML (HyperText Markup Language) format for displaying various setting screens regarding the printer 2 on displays of the administrator terminal 4A and user terminal 4B.

The web page storing area 30 stores a user web page 34 that is displayed on the administrator terminal 4A and user terminal 4B, and an administrator web page 36 that is displayed on the administrator terminal 4A.

The user web page 34 is a device web page that is displayed via the Internet NT on a browser screen of a display of the administrator terminal 4A or user terminal 4B in response to access from the administrator terminal 4A or user terminal 4B. The user web page 34 is configured to be operable by operation of the administrator terminal 4A by the administrator and operation of the user terminal 4B by the ordinary user.

The user web page 34 includes a manual reception selecting section 38, which is configured to receive, from a user, an instruction (referred to below as a manual reception instruction) to execute a manual reception process for acquiring a print job from the cloud print server 5. This will be detailed later.

The administrator web page 36 is a device web page that is displayed via the Internet NT on a browser screen of a display of the administrator terminal 4A in response to access from the administrator terminal 4A. The administrator web page 36 is configured to be operable by operation of the administrator terminal 4A by the administrator.

The administrator web page 36 includes a service mode selecting section 40, which is configured to receive, from the administrator, selection of one of a plurality of service modes (described later) of the printer 2 in the cloud print system 1. The administrator web page 36 also serves as a reception unit that receives a removal instruction.

The service mode storing area 32 stores mode information indicating a service mode (or current service mode) in which the printer 2 is operating. When one of the service modes is selected on the service mode selecting section 40, the mode information is set to indicate the selected service mode. Also, when one of the service modes is selected by operation of the operation panel 16A by the administrator, the mode information is set to indicate the selected service mode.

The controller 10 controls respective units, such as the memory 12, communication unit 14, printing unit 15, and operation unit 16, in the printer 2. The controller 10 is based around a CPU (Central Processing Unit) (not shown). The controller 10 reads predetermined programs from the memory 12 and executes them, thereby controlling the respective units to perform various processes, such as a printing process.

The controller 10 receives various information from the cloud print server 5 via the communication unit 14, and sends various information via the communication unit 14 to the cloud print server 5.

The controller 10 has an automatic reception function of, upon receiving a print job reception notification from the cloud print server 5, sending, in response to the print job reception notification, to the cloud print server 5, a request (referred to below as a first transmission request) to send the print job. The controller 10 receives the print job sent from the cloud print server 5 in response to the first transmission request. The controller 10 may print the received print job.

The controller 10 further has a manual reception function of sending, in response to operation by a user, to the cloud print server 5, a request (referred to below as a second transmission request) to send the print job. The controller 10 receives the print job sent from the cloud print server 5 in response to the second transmission request if the print job is stored in the cloud print server 5. The controller 10 may print the received print job.

The controller 10 serves as a manager that manages the service modes of the printer 2. Specifically, the controller 10 manages the mode information in the service mode storing area 32, and controls the operation of the printer 2 based on the mode information stored in the service mode storing area 32.

The service modes include a registered mode in which the printer 2 is registered with the cloud print server 5, and an unregistered mode in which the printer 2 is not registered with the cloud print server 5.

In the registered mode, the service modes include a service enabled mode (first mode), a service stopped mode (second mode), and a service disabled mode (third mode). The service enabled mode is a mode in which the controller 10 receives a print job reception notification sent from the cloud print server 5 when the cloud print server 5 receives a print job, and sends, in response to the print job reception notification, a first transmission request to the cloud print server 5. The service enabled mode may be a mode in which the automatic reception function is enabled. The service stopped mode is a mode in which the controller 10 receives no print job reception notification from the cloud print server 5 when the cloud print server 5 receives a print job, but sends, in response to operation by a user, a second transmission request to the cloud print server 5. The service stopped mode may be a mode in which the automatic reception function is disabled but the manual reception function is enabled. The service disabled mode is a mode in which the controller 10 receives no print job reception notification from the cloud print server 5 when the cloud print server 5 receives a print job, and sends the cloud print server 5 no request to send the print job. The service disabled mode may be a mode in which both the automatic reception function and manual reception function are disabled.

The mode information indicates whether the printer 2 is registered with the cloud print server 5 (specifically, one of the registered mode and the unregistered mode). In the registered mode, the mode information further indicates which of the service modes the printer 2 is in (specifically, one of the service enabled mode, service stopped mode, and service disabled mode). More specifically, the mode information is set to indicate one of the service enabled mode, service stopped mode, service disabled mode, and unregistered mode.

When a reception unit (the operation unit 16 or administrator web page 36) receives a removal instruction, the controller 10 sends, to the cloud print server 5, a request (referred to below as a third transmission request) to send the print job, and then sends, to the cloud print server 5, a request to remove the registration of the printer 2 from the cloud print server 5. Specifically, as the request to remove the registration, the controller 10 sends a request (referred to below as a deletion request) to delete the identification information for the printer 2 from the cloud print server 5.

In this embodiment, when the removal instruction is received, if the automatic reception function is disabled, the controller 10 sends the third transmission request, and then sends the deletion request; if the automatic reception function is enabled, the controller 10 sends the deletion request without sending the third transmission request.

More specifically, when the removal instruction is received while the printer 2 is in the second mode or third mode, the controller 10 sends the third transmission request, and then sends the deletion request; when the removal instruction is received while the printer 2 is in the first mode, the controller 10 sends the deletion request without sending the third transmission request.

After sending the third transmission request, the controller 10 receives the print job sent from the cloud print server 5 in response to the third transmission request when the print job is left in the cloud print server 5 (specifically, when the print job is left in the cloud print server 5 without being sent to the printer 2).

The controller 10 outputs the received print job, and then sends the deletion request to the cloud print server 5. For example, the controller 10 prints the received print job (specifically, causes the printing unit 15 to print the received print job). However, the controller 10 may output the received print job by displaying or transmitting it.

After outputting the received print job, the controller 10 sends a notification of completion of output to the cloud print server 5, and then sends the deletion request to the cloud print server 5.

When the cloud print server 5 receives the deletion request from the printer 2, it deletes the identification information for the printer 2 to remove the registration of the printer 2 from the cloud print server 5. Upon completion of the deletion, the cloud print server 5 sends, to the printer 2, a notification (referred to below as a deletion completion notification) of completion of the deletion (or removal) in response to the deletion request. When the controller 10 receives the deletion completion notification from the cloud print server 5, it updates the mode information to indicate the unregistered mode.

In FIG. 1, the controller 10 includes a print controller 18, a print job reception notification receiving controller 20, a print job receiving controller 22, a service mode controller 24, a web page controller 26, a manual reception controller 28, an identification information registration controller 42, an identification information deletion controller 44, and a remaining print job receiving controller 46.

The print controller 18 prints print data, which is data to be actually printed, included in a print job received from the cloud print server 5 via the Internet NT on a print medium such as a sheet of paper. Specifically, the print controller 18 controls the printing unit 15 to print the print data.

The print job reception notification receiving controller 20 detects a print job reception notification, which indicates that a print job has been received by the cloud print server 5, received from the cloud print server 5 via the Internet NT.

When the print job reception notification receiving controller 20 detects a print job reception notification, the print job receiving controller 22 acquires the print job from the cloud print server 5. The print job receiving controller 22 supplies the acquired print job to the print controller 18, causing it to print the print job.

The service mode controller 24 sets the mode information in the service mode storing area 32 in accordance with operation of the operation panel 16A by the administrator or operation of the service mode selecting section 40 via the administrator terminal 4A by the administrator.

The web page controller 26 obtains a device web page from the web page storing area 30 in the memory 12 and sends it to the administrator terminal 4A or user terminal 4B. The web page controller 26 provides different device web pages to the administrator terminal 4A and user terminal 4B, which have different authorities to set the printer 2. Specifically, the web page controller 26 provides the user web page 34 and administrator web page 36 to the administrator terminal 4A in response to access from the administrator terminal 4A, and provides the user web page 34 to the user terminal 4B in response to access from the user terminal 4B.

When the manual reception controller 28 receives a manual reception instruction by operation of the operation panel 16A by a user, operation of the manual reception selecting section 38 via the administrator terminal 4A by the administrator, or operation of the manual reception selecting section 38 via the user terminal 4A by a user, it acquires a print job from the cloud print server 5 via the Internet NT. The manual reception controller 28 supplies the acquired print job to the print controller 18, causing it to print the print job.

As such, the printer 2 has a function of, upon receiving a print job reception notification from the cloud print server 5, acquiring a print job from the cloud print server 5 and printing it without user's operation, and a function of, in response to operation of the operation panel 16A or manual reception selecting section 38 by a user, acquiring a print job from the cloud print server 5 and printing it.

Before the use of the cloud print service, in accordance with operation of the operation panel 16A by a user or operation of the administrator web page 36 via the administrator terminal 4A by the administrator, the identification information registration controller 42 sends an identification information registration request to the cloud print server 5, thereby causing the cloud print server 5 to register a printer ID for the printer 2 as a unique identification information identifying the printer 2 in the cloud print system 1.

When the use of the cloud print service is stopped, in accordance with operation of the operation panel 16A by a user or operation of the administrator web page 36 via the administrator terminal 4A by the administrator, the identification information deletion controller 44 sends an identification information deletion request (or deletion request) to the cloud print server 5, thereby causing the cloud print server 5 to delete the printer ID therefrom.

In the service stopped mode or service disabled mode, when the printer ID is deleted from the cloud print server 5, if a print job is left in the cloud print server 5 without being sent to the printer 2, the remaining print job receiving controller 46 acquires the remaining print job from the cloud print server 5 via the Internet NT and supplies the acquired print job to the print controller 18, causing it to print the print job.

1-3. Configuration of Cloud Print Server

Figure 2:
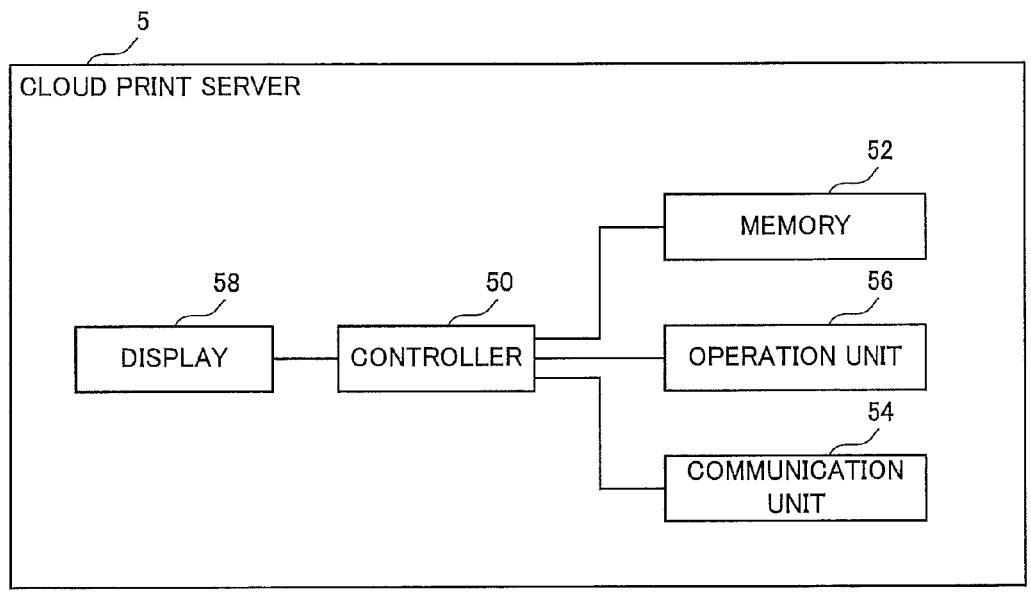
FIG. 2 is a schematic block diagram illustrating a configuration of a cloud print server.

As shown in FIG. 2, the cloud print server 5 includes a controller 50, a memory 52, a communication unit 54, an operation unit 56, and a display 58. The controller 50 controls respective units, such as the memory 52, communication unit 54, operation unit 56, and display 58, in the cloud print server 5. The controller 50 is based around a CPU (not shown). The controller 50 reads predetermined programs from the memory 52 and executes them, thereby controlling the respective units to perform various processes. The memory 52 may includes a ROM, a RAM, a hard disc drive, a flash memory, or the like.

The communication unit 54 sends and receives data to and from the printer 2, administrator terminal 4A, and user terminal 4B via the Internet NT.

When the controller 50 receives an identification information registration request from the printer 2 via the communication unit 54, it issues a printer ID for the printer 2 and sends the printer ID to the printer 2 via the communication unit 54.

The controller 50 registers, in a cloud printer list in the memory 52, the printer ID for the printer 2 and the account for the administrator of the printer 2 to which the printer ID is assigned in association with each other. In the cloud printer list, for each printer available in the cloud print system 1, one printer ID for the printer is registered in association with the account for one administrator of the printer. The administrator of the printer 2 can provide an ordinary user with authority to use the printer 2 by performing a process for sharing the printer 2 with respect to the ordinary user.

When the controller 50 receives an identification information deletion request from the printer 2 via the communication unit 54, it deletes the printer ID for the printer 2 from the cloud printer list.

For each printer ID registered with the cloud printer list, the memory 52 stores a print job queue for storing print jobs to be printed at the printer to which the printer ID is assigned.

The operation unit 56 includes, for example, a keyboard and a mouse, and receives operation instructions from an operator. The display 58 includes, for example, an LCD, and displays image data outputted from the controller 50.

1-4. Configurations of Administrator Terminal and User Terminal

The configuration of the administrator terminal 4A will be described below.

Figure 3:
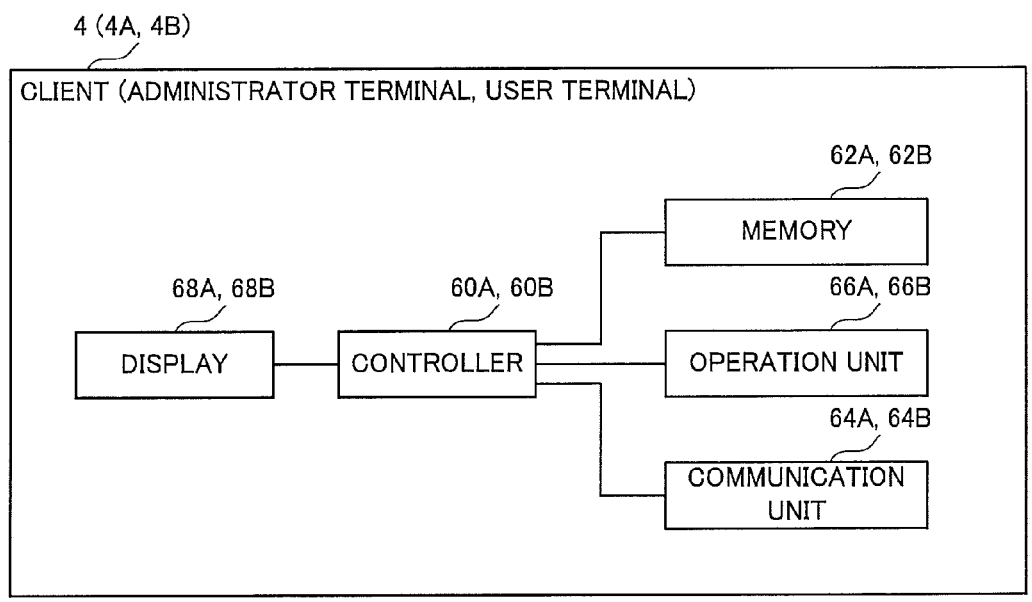
FIG. 3 is a schematic block diagram illustrating configurations of an administrator terminal and a user terminal.

As shown in FIG. 3, the administrator terminal 4A includes a controller 60A, a memory 62A, a communication unit 64A, an operation unit 66A, and a display 68A. The controller 60A controls respective units, such as the memory 62A, communication unit 64A, operation unit 66A, and display 68A, in the administrator terminal 4A. The controller 60A is based around a CPU (not shown). The controller 60A reads predetermined programs from the memory 62A and executes them, thereby controlling the respective units to perform various processes. The memory 62A may include a ROM, a RAM, a hard disc drive, a flash memory, or the like.

The communication unit 64A sends and receives data to and from the printer 2, user terminal 4B, and cloud print server 5 via the Internet NT. The memory 62A stores various print jobs. The controller 60A reads a print job from the memory 62A and sends it to the cloud print server 5 while designating a printer to which the print job is to be sent.

The operation unit 66A includes, for example, a keyboard and a mouse, and receives operation instructions from the administrator. The display 68A includes, for example, an LCD, and displays image data, such as image data of a device web page of the printer 2, outputted from the controller 60A.

The configuration of the user terminal 4B is substantially the same as that of the administrator terminal 4A; the user terminal 4B includes a controller 60B that controls respective units (a memory 62B, a communication unit 64B, an operation unit 66B, and a display 68B) in the user terminal 4B.

1-5. Description of Service Modes

In accordance with operation by the administrator, the service mode of the printer 2 in the cloud print system 1 is set to one of the four service modes: the service enabled mode, service stopped mode, service disabled mode, and unregistered mode.

The printer 2 is configured so that only the administrator can switch the service mode of the printer 2. Specifically, the controller 10 displays, on the operation panel 16A, a service mode setting screen DIP1 shown in FIG. 4. The service mode setting screen DIP1 displays a selection section SEL1 and a decision section DEC1. The selection section SEL1 is configured so that the administrator can select, as the service mode, one of the service enabled mode, service stopped mode, service disabled mode, and unregistered mode. The decision section DEC1 is configured so that the administrator can execute setting of the selected service mode or cancel the selection of a service mode.

When the service mode controller 24 receives the selection of a service mode by the administrator from the operation panel 16A, it sets the mode information in the service mode storing area 32 to indicate the selected service mode.

The cloud print system 1 is configured so that the service mode can be switched not only through the operation panel 16A of the printer 2 but also through the administrator terminal 4A. Specifically, in accordance with operation by the administrator, the controller 60A of the administrator terminal 4A receives the administrator web page 36 from the printer 2 via the Internet NT, thereby displaying a service mode setting screen DIP2 shown in FIG. 5 on the display 68A. The service mode setting screen DIP2 displays a selection section SEL2 and a decision section DEC2. The selection section SEL2 is configured so that the administrator can select, as the service mode, one of the service enabled mode, service stopped mode, service disabled mode, and unregistered mode. The decision section DEC2 is configured so that the administrator can execute setting of the selected service mode or cancel the selection of a service mode.

When the service mode controller 24 receives the selection of a service mode by the administrator from the administrator terminal 4A via the Internet NT, it sets the mode information in the service mode storing area 32 to indicate the selected service mode.

As such, the cloud print system 1 is configured so that the service mode of the printer 2 can be switched by operation of the operation panel 16A of the printer 2 or operation of the device web page displayed on the display 68A of the administrator terminal 4A.

In the service enabled mode, a persistent connection exists between the printer 2 and the cloud print server 5 via the Internet NT, and when a print job is sent from a client 4 to the cloud print server 5, a print job reception notification is sent from the cloud print server 5 to the printer 2 via the Internet NT. Further, in the service enabled mode, the above-described manual reception can be executed.

In the service stopped mode, there is no persistent connection between the printer 2 and the cloud print server 5 via the Internet NT, and when a print job is sent from a client 4 to the cloud print server 5, no print job reception notification is sent from the cloud print server 5 to the printer 2, but the manual reception can be executed by the printer 2.

In the service disabled mode, there is no persistent connection between the printer 2 and the cloud print server 5 via the Internet NT, and when a print job is sent from a client 4 to the cloud print server 5, no print job reception notification is sent from the cloud print server 5 to the printer 2, and the manual reception cannot be executed by the printer 2. Hereinafter, either the service stopped mode or the service disabled mode will be referred to as the service stopped/disabled mode. In the service stopped/disabled mode, even when a print job is sent from a client 4 to the cloud print server 5, the cloud print server 5 sends the printer 2 no print job reception notification, and therefore the printer 2 receives no print job reception notification from the cloud print server 5.

In the unregistered mode, the printer 2 is not registered with the cloud printer list in the cloud print server 5.

1-6. Printing Process Procedure

The printing process procedure of the cloud print system 1 in each of the service enabled mode, service stopped mode, and service disabled mode will be described below. It will be assumed that the printer 2 has already been registered with the cloud printer list in the cloud print server 5.

1-6-1. Printing Process Procedure in Service Enabled Mode

Figure 6:
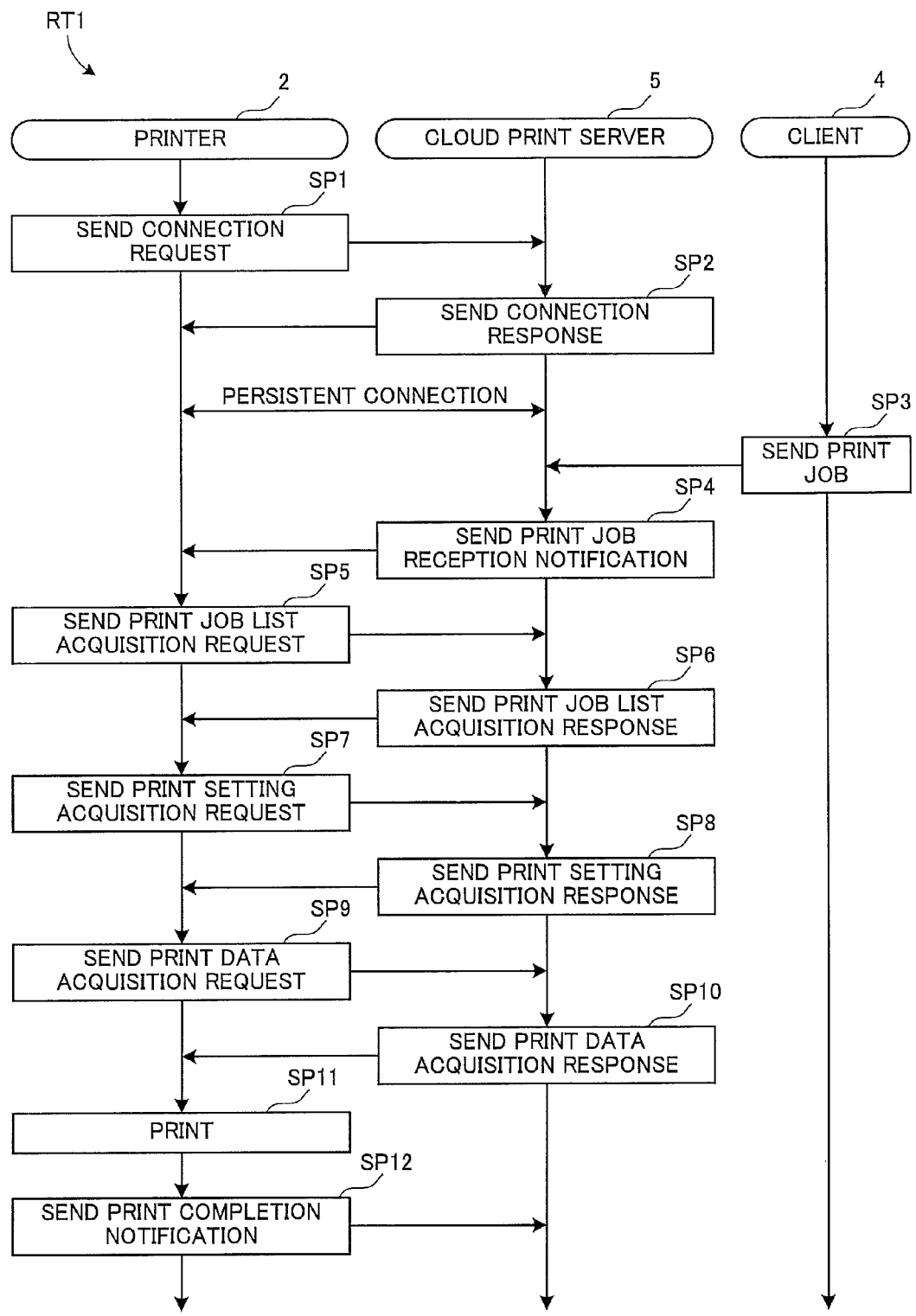
FIG. 6 is a sequence chart illustrating a printing process procedure in a service enabled mode.

The printing process procedure RT1 by the cloud print system 1 in the service enabled mode will be described with reference to FIG. 6.

When the printer 2 is powered on, the controller 10 of the printer 2 sends a connection request to the cloud print server 5 by the print job reception notification receiving controller 20 in step SP1.

Upon receiving the connection request, the controller 50 of the cloud print server 5 sends a connection response to the printer 2 in step SP2.

Upon receiving the connection response, the controller 10 of the printer 2 establishes a persistent connection between the print job reception notification receiving controller 20 and the controller 50 of the cloud print server 5. The processes in steps SP1, SP2, and SP4 (described later) use, for example, XMPP (Extensible Messaging and Presence Protocol), which is an XML (Extensible Markup Language) based protocol; the printer 2 and cloud print server 5 are connected by using XMPP in the persistent connection state.

When a print job is sent from a client 4 to the cloud print server 5 with the printer 2 as a destination of the print job in step SP3 and is stored in the print job queue for the printer 2 in the memory 52 in the cloud print server 5, the controller 50 of the cloud print server 5 sends a print job reception notification to the printer 2 in step SP4.

Upon receiving the print job reception notification by the print job reception notification receiving controller 20, the printer 2 sends a print job list acquisition request (or first transmission request) to the cloud print server 5 by the print job receiving controller 22 in step SP5.

Upon receiving the print job list acquisition request, the controller 50 of the cloud print server 5 sends a print job list acquisition response to the printer 2 in step SP6. The print job list acquisition response includes a print job list JL for the printer 2 shown in FIG. 7. Such a print job list is prepared for each printer registered with the cloud print server 5.

In FIG. 7, the print job list JL lists two print jobs to be printed at the printer 2. The print job list JL includes a record for each print job; each record includes a "job ID" field, a "file name" field, a "status" field, a "print data storage location" field, and a "print setting storage location" field.

The "job ID" field indicates a job identifier (ID) that is an unique identification information assigned to the print job. The "file name" field indicates the file name of a print data. The "status" field indicates the current printing status of the print job and takes one of four values: "Waiting", "Being Processed", "Error", and "Printed". "Waiting" indicates that the print job is stored in the memory 52 in the cloud print server 5 and has not been sent to the destination printer; "Being Processed" indicates that the print job has been sent from the cloud print server 5 to the destination printer and is being printed; "Error" indicates that the print job has been sent from the cloud print server 5 to the destination printer but an error has occurred during the printing; "Printed" indicates that the print job has been sent from the cloud print server 5 to the destination printer and printed normally.

The "print data storage location" field indicates the URL (Uniform Resource Locator) at which the print data is stored in the print job queue of the memory 52. The "print setting storage location" field indicates the URL at which print settings, such as a paper size and a color mode (monochrome or color), used in printing the print data.

Upon receiving the print job list JL, when the print job list JL includes one or more print jobs whose "status" field is "Waiting" (i.e., print jobs in "Waiting" status), the printer 2 processes each of the one or more print jobs. Specifically, when the print job list JL includes N (where N is a positive integer) print jobs in "Waiting" status, the printer 2 cooperates with the cloud print server 5 to perform a process of steps SP7 to SP11 N times, thereby printing all the print jobs to be printed at the printer 2, as described below.

The printer 2 sends a print setting acquisition request to the cloud print server 5 by the print job receiving controller 22 in step SP7.

Upon receiving the print setting acquisition request, the controller 50 of the cloud print server 5 sends a print setting acquisition response to the printer 2 in step SP8.

Upon receiving the print setting acquisition response, the print job receiving controller 22 of the printer 2 acquires the print settings from the URL indicated by the "print setting storage location" field of the print job currently being processed in the print job list JL, and sends a print data acquisition request to the cloud print server 5 in step SP9.

Upon receiving the print data acquisition request, the controller 50 of the cloud print server 5 sends a print data acquisition response to the printer 2 in step SP10.

Upon receiving the print data acquisition response by the print job receiving controller 22, the printer 2 acquires the print data from the URL indicated by the "print data storage location" field of the print job currently being processed in the print job list JL, and prints the print data based on the print settings by the print controller 18 in step SP11.

When the printing of the print data is completed, the printer 2 sends a print completion notification to the cloud print server 5 by the print job receiving controller 22 in step SP12. The print completion notification indicates "Printed" if the printing has been completed normally; it indicates "Error" if an error has occurred during the printing.

Upon receiving the print completion notification, the controller 50 of the cloud print server 5 updates the value of the "status" field of the print job currently being processed in the print job list JL to "Printed" or "Error" in accordance with the print completion notification. After a predetermined period of time has elapsed from the updating, the controller 50 deletes, from the memory 52, the print job for which the "status" field has been updated to "Printed" or "Error".

Steps SP3, SP5 to SP10, and SP12 use HTTP (HyperText Transfer Protocol), for example.

As such, the printer 2 acquires, via the Internet NT, a print job sent from the client 4 via the Internet NT to the cloud print server 5, and prints the print data based on the acquired print job.

1-6-2. Printing Process Procedure in Service Stopped Mode

The printing process procedure RT2 by the cloud print system 1 in the service stopped mode will now be described with reference to FIG. 8. The following description illustrates a case where the service mode is switched from the service enabled mode to the service stopped mode. At first, since the printer 2 is in the service enabled mode, the print job reception notification receiving controller 20 of the printer 2 and the controller 50 of the cloud print server 5 are in a persistent connection state.

In step SP21, by the service mode controller 24, the printer 2 receives an instruction to switch the service mode to the service stopped mode, and sets the mode information in the service mode storing area 32 to indicate the service stopped mode.

In step SP22, the controller 10 performs a disconnect process to disconnect the persistent connection between the print job reception notification receiving controller 20 and the controller 50 of the cloud print server 5.

When a print job is sent from a client 4 to the cloud print server 5 with the printer 2 as a destination of the print job in step SP23, the controller 50 of the cloud print server 5 stores the print job in the print job queue for the printer 2 in the memory 52 in step SP24.

In the service stopped mode, the cloud print server 5 sends no print job reception notification to the printer 2, but stores the print job received from the client 4, preparing for a possible future request for the print job from the printer 2.

When the printer 2 receives a manual reception instruction (or manual print instruction) by the manual reception controller 28 in step SP25, it sends a print job list acquisition request (or second transmission request) to the cloud print server 5 by the manual reception controller 28 in step SP26.

In steps SP26 to SP33, the printer 2 and cloud print server 5 perform the same process as in steps SP5 to SP12 in the printing process procedure RT1 (FIG. 6), thereby printing, at the printer 2, print jobs stored in the cloud print server 5 after the switching from the service enabled mode to the service stopped mode and before the execution of the manual reception.

At this time, when the print job list JL includes at least one print job, the printer 2 selects one or more of the at least one print job in accordance with operation by a user, and receives and prints the selected print jobs. However, the printer 2 may print all of the at least one print job.

As such, when a print job is sent from a client 4 to the cloud print server 5 in the service stopped mode, the cloud print system 1 stores the print job in the cloud print server 5 without sending the print job reception notification from the cloud print server 5 to the printer 2. Then, when a manual reception instruction is given to the printer 2, the cloud print system 1 sends the stored print job from the cloud print server 5 to the printer 2 and prints it at the printer 2.

1-6-3. Printing Process Procedure in Service Disabled Mode

Figure 9:
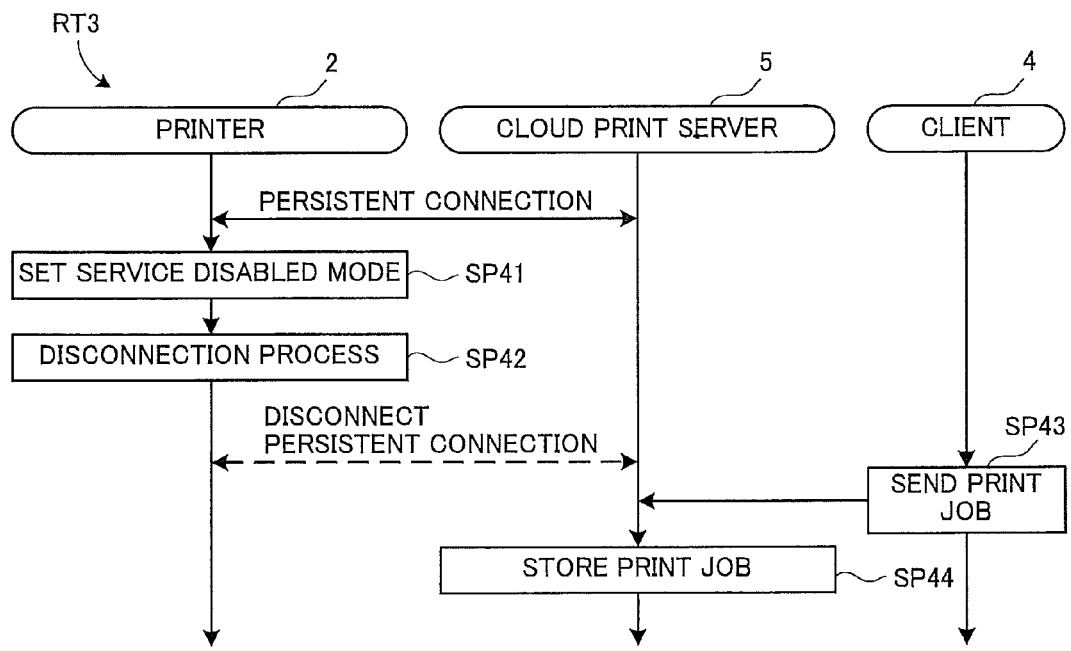
FIG. 9 is a sequence chart illustrating a printing process procedure in a service disabled mode.

The printing process procedure RT3 by the cloud print system 1 in the service disabled mode will now be described with reference to FIG. 9. The following description illustrates a case where the service mode is switched from the service enabled mode to the service disabled mode. At first, since the printer 2 is in the service enabled mode, the print job reception notification receiving controller 20 and the cloud print server 5 are in a persistent connection state.

In step SP41, by the service mode controller 24, the printer 2 receives an instruction to switch the service mode to the service disabled mode, and sets the mode information in the service mode storing area 32 to indicate the service disabled mode.

In step SP42, the controller 10 performs a disconnect process to disconnect the persistent connection between the print job reception notification receiving controller 20 and the controller 50 of the cloud print server 5.

When a print job is sent from a client 4 to the cloud print server 5 with the printer 2 as a destination of the print job in step SP43, the controller 50 of the cloud print server 5 stores the print job in the print job queue for the printer 2 in the memory 52 in step SP44.

In the service disabled mode, since no print job reception notification is sent from the cloud print server 5 to the printer 2 and the manual reception cannot be executed, the print job stored in the cloud print server 5 cannot be printed at the printer 2. In order to print the print job, which is stored in the cloud print server 5 in the service disabled mode, at the printer 2, the printer 2 needs to switch the service mode to the service enabled mode, or to switch the service mode to the service stopped mode and then execute the manual reception.

When the service mode is switched from the service disabled mode to the service enabled mode, the cloud print server 5 sends a print job reception notification to the printer 2. Thus, the printer 2 and cloud print server 5 perform the same process as in steps SP5 to SP12 in the printing process procedure RT1, thereby printing, at the printer 2, print jobs stored in the cloud print server 5 in the service disabled mode.

1-7. Identification Information Deletion Process Procedure

Figure 10:
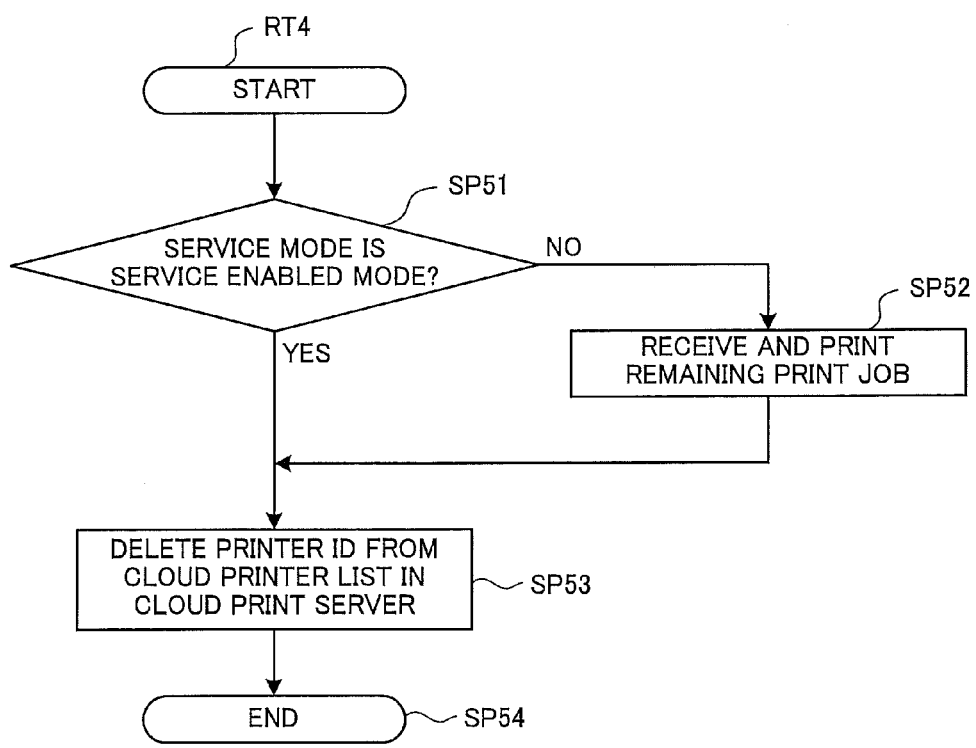
FIG. 10 is a flowchart illustrating an identification information deletion process procedure.

The procedure of the identification information deletion process by the printer 2 will be described specifically below with reference to FIG. 10. When the controller 10 receives an instruction to switch the service mode to the unregistered mode through operation of the operation panel 16A by the administrator or operation of the administrator web page 36 displayed on the display 68A of the administrator terminal 4A, it reads an identification information deletion process program from the memory 12 to execute it, thereby starting the identification information deletion process procedure RT4 to move to step SP51.

In step SP51, the controller 10 determines whether the printer 2 is in the service enabled mode. If a negative determination is made (NO in step SP51), the controller 10 moves to step S52. The negative determination indicates that, since the printer 2 is currently in the service stopped mode or the service disabled mode, a print job may be left in the cloud print server 5, and it is necessary to perform a process (referred to below as a remaining print job acquisition process) for acquiring a remaining print job left in the cloud print server 5.

In step SP52, the controller 10 performs a remaining print job acquisition process by the remaining print job receiving controller 46. With this process, if there are one or more remaining print jobs left in the cloud print server 5, the controller 10 acquires the remaining print jobs, and performs printing based on the remaining print jobs by the print controller 18, proceeding to step SP53.

In step SP53, the controller 10 deletes the printer ID for the printer 2 from the cloud printer list in the cloud print server 5 by the identification information deletion controller 44.

On the other hand, if a positive determination is made (YES in step SP51), the controller 10 moves to step S53 and deletes the printer ID for the printer 2 from the cloud printer list in the cloud print server 5 by the identification information deletion controller 44. The positive determination indicates that, since the printer 2 is currently in the service enabled mode, in which as soon as a print job is stored in the cloud print server 5, the printer 2 receives the print job, no print job is left in the cloud print server 5, and it is not necessary to perform the remaining print job acquisition process.

Then, the controller 10 proceeds to step SP54 to end the identification information deletion process procedure RT4. As such, in the service stopped mode or service disabled mode, in which a print job may be left in the cloud print server 5, the printer 2 performs the remaining print job acquisition process and then deletes the printer ID.

Figure 11:
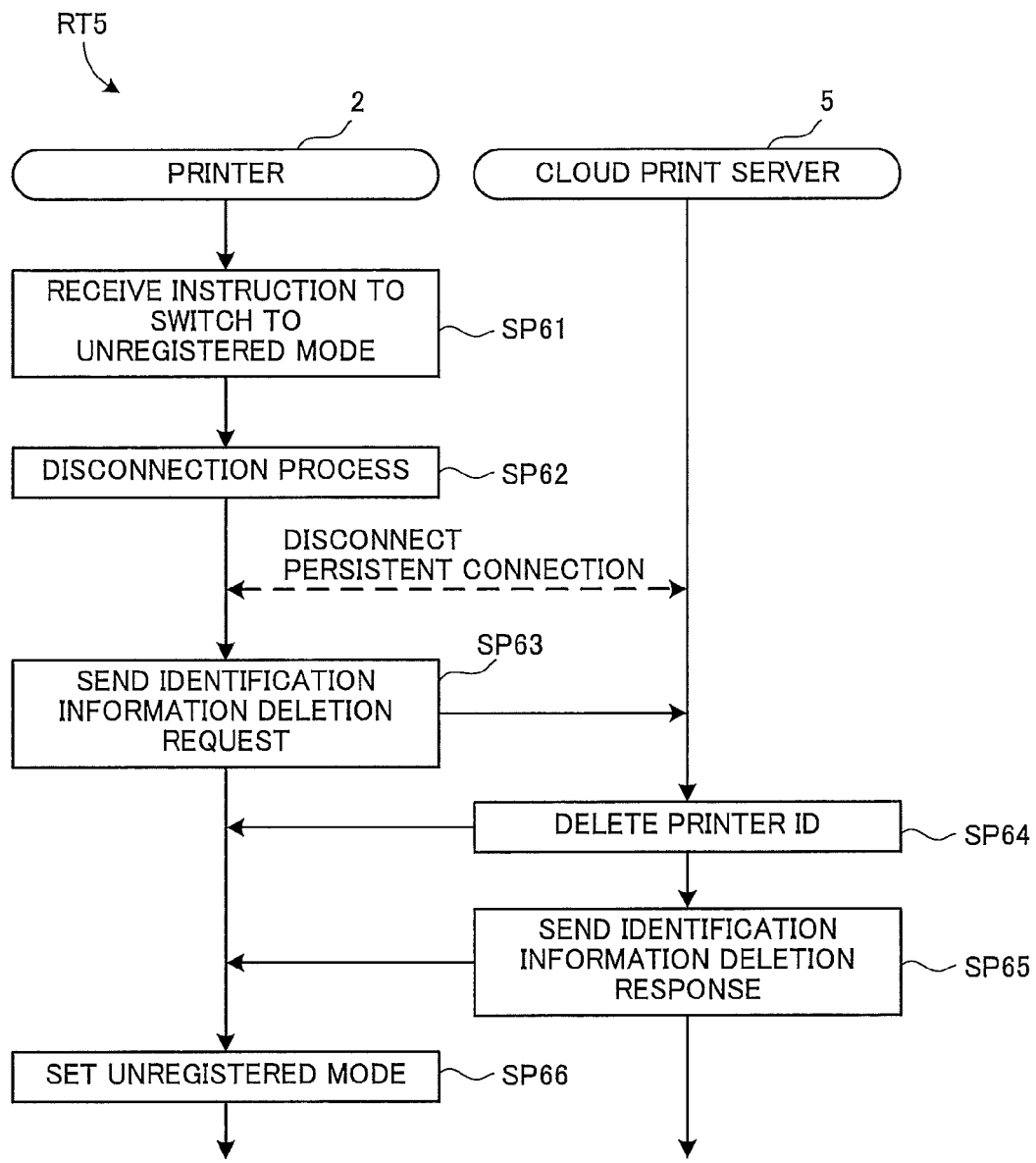
FIG. 11 is a sequence chart illustrating an identification information deletion process procedure in the service enabled mode.

1-7-1. Identification Information Deletion Process Procedure in Service Enabled Mode The identification information deletion process procedure RT5 by the cloud print system 1 in the service enabled mode will be described with reference to FIG. 11.

When the printer 2 receives, by the service mode controller 24, an instruction to switch the service mode to the unregistered mode in step SP61, it performs a disconnection process by the controller 10 in step SP62, thereby disconnecting the persistent connection between the print job reception notification receiving controller 20 and the controller 50 of the cloud print server 5.

In step SP63, the printer 2 sends an identification information deletion request to the cloud print server 5 by the identification information deletion controller 44.

Upon receiving the identification information deletion request, the controller 50 of the cloud print server 5 deletes the printer ID for the printer 2 from the cloud printer list in step SP64, and sends an identification information deletion response to the printer 2 in step SP65.

Upon receiving the identification information deletion response by the identification information deletion controller 44, the printer 2 sets the mode information in the service mode storing area 32 to indicate the unregistered mode, by the service mode controller 24 in step SP66.

As such, when switching from the service enabled mode to the unregistered mode, the printer 2 causes the cloud print server 5 to delete the printer ID without performing the remaining print job acquisition process.

Figure 12:
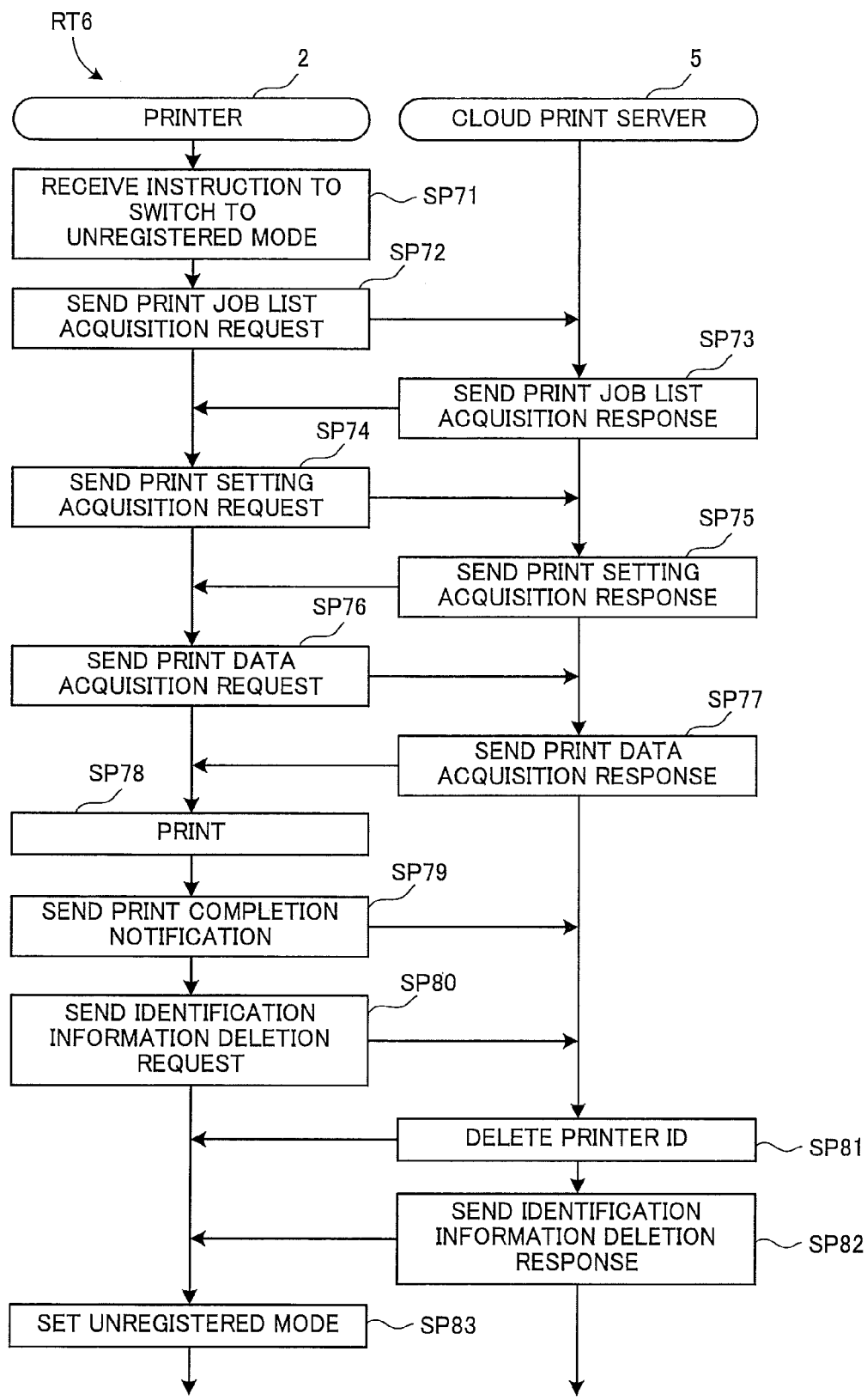
FIG. 12 is a sequence chart illustrating an identification information deletion process procedure in a service stopped/disabled mode.

1-7-2. Identification Information Deletion Process Procedure in Service Stopped/Disabled Mode The identification information deletion process procedure RT6 by the cloud print system 1 in the service stopped/disabled mode will be described with reference to FIG. 12.

When the printer 2 receives, by the service mode controller 24, an instruction to switch the service mode to the unregistered mode in step SP71, it sends a print job list acquisition request (or third transmission request) to the cloud print server 5 by the remaining print job receiving controller 46 in step SP72.

In steps SP72 to SP79, the printer 2 and cloud print server 5 perform the same process as in steps SP5 to SP12 in the printing process procedure RT1 (FIG. 6), so that, if one or more print jobs are left in the cloud print server 5, the printer 2 acquires and prints the remaining print jobs.

In steps SP80 to SP83, the printer 2 and cloud print server 5 perform the same process as in steps SP63 to SP66 in the identification information deletion process procedure RT5 (FIG. 11) in the service enabled mode, so as to delete the printer ID for the printer 2 from the cloud printer list in the cloud print server 5 and set the mode information in the service mode storing area 32 in the printer 2 to indicate the unregistered mode.

1-8. Advantages

As described above, when receiving an instruction to remove the registration, the printer 2 sends the print server 5 a request to send the print job, and then sends the print server 5 a request to remove the registration. This makes it possible to improve the reliability of the cloud print system 1.

When receiving an instruction to remove the registration, if the printer 2 sent the print server 5 a request to remove the registration without sending the print server 5 a request to send the print job, the registration might be removed with a print job for the printer 2 left in the print server 5, degrading the reliability of the cloud print system 1. According to the present embodiment, it is possible to prevent a situation where the registration is removed while a print job for the printer 2 is left in the print server 5 without being sent, improving the reliability of the cloud print system 1.

Specifically, in this embodiment, the printer 2 is configured so that, in the service stopped/disabled mode, which is a mode in which the printer 2 receives no print job reception notification, when deleting the printer ID for the printer 2 registered with the cloud print server 5, if one or more print jobs are left in the cloud print server 5, the printer 2 acquires all the remaining print jobs from the cloud print server 5, completes printing of the remaining print jobs, and then causes the cloud print server 5 to delete the printer ID. Thus, the printer 2 can prevent a situation where the printer ID for the printer 2 is deleted from the cloud printer list while a print job with the printer 2 as a designated destination is left in the cloud print server 5.

In the service stopped/disabled mode, when a print job is sent from a client 4 to the cloud print server 5, no print job reception notification is sent from the cloud print server 5 to the printer 2. Thus, the printer 2 cannot detect that a print job is sent to the cloud print server 5.

Therefore, if the remaining print job acquisition process was not performed, the cloud print system 1 would have the following drawbacks. In the service stopped/disabled mode, when the printer ID for the printer 2 registered with the cloud print server 5 is deleted, even if a print job to be printed at the printer 2 is stored in the cloud print server 5, the printer 2 cannot detect it. Thus, in the service stopped/disabled mode, when the printer ID for the printer 2 registered with the cloud print server 5 is deleted, the print job may be deleted, and the printer 2 cannot detect that there was a print job for the printer 2 in the cloud print server 5.

In this embodiment, the printer 2 is configured so that, in the service stopped/disabled mode, when deleting the printer ID for the printer 2 registered with the cloud print server 5, if one or more print jobs are left in the cloud print server 5, the printer 2 acquires all of the remaining print jobs from the cloud print server 5, completes printing of them, and then causes the cloud print server 5 to delete the printer ID. Accordingly, the printer 2 can prevent print jobs stored in the cloud print server 5 during the service stopped/disabled mode from being deleted upon deletion of the printer ID. Thus, it is possible, when the printer ID for the printer 2 is deleted from the cloud print server 5 by administrator's operation, to ensure printing of a print job sent by a user to the cloud print server 5.

2. Other Embodiments

The above embodiment illustrates a case where the service mode is switched in accordance with operation of the operation panel 16A by a user or operation of the administrator web page 36 of the device web pages of the printer 2 via the administrator terminal 4A. However, the service mode may be switched in other ways; for example, it may be automatically switched in accordance with various conditions, such as time of day.

The above embodiment illustrates a case where one printer is connected to the cloud print server 5, but two or more printers may be connected to the cloud print server 5. In this case, for each of the printers, the cloud print server 5 issues a printer ID unique to the printer and registers it with the cloud printer list in the memory 52.

The above embodiment illustrates a case where the administrator terminal 4A and user terminal 4B are connected to the cloud print server 5 as the clients 4, but one, three, or more clients may be connected to the cloud print server 5.

The above embodiment illustrates a case where the administrator terminal 4A and user terminal 4B are different terminals, but a single terminal may serve as both the administrator terminal 4A and user terminal 4B. In this case, the printer 2 may be configured as follows: when the terminal is operated by a user, the printer 2 allows the display of the terminal to display the user web page 34; when the terminal is operated by the administrator, the printer 2 allows the display of the terminal to display the user web page 34 and administrator web page 36.

The above embodiment illustrates a case where, when a print job is sent from a client 4 to the cloud print server 5, the cloud print server 5 sends a print job reception notification to the printer 2. However, a device other than the cloud print server 5 may send a print job reception notification to the printer 2.

The above embodiment illustrates a case where the cloud print server 5 is implemented by a single device, but the cloud print server 5 may be implemented by a plurality of devices. For example, the cloud print server 5 may include a plurality of separate devices: a device for functioning as the controller 50, a device for storing a print job, and a device for storing the cloud printer list.

The above embodiment illustrates a case where steps SP3, SP5 to SP10, and SP12 in the printing process procedure RT1 use HTTP, but the steps may use various protocols such as HTTPS (HyperText Transfer Protocol Secure).

The above embodiment illustrates a case where the printer 2, user terminal 4B, administrator terminal 4A, and cloud print server 5 are connected with each other via the Internet NT, but they may be connected via various communication means, such as USB cable, and a wired or wireless LAN conforming to IEEE (Institute of Electrical and Electronics Engineers) 802.3u/ab, IEEE802.11a/b/g/n, or other standard.

The above embodiment illustrates a case where the present invention is applied to the cloud print system 1 that prints, at the printer 2, a print job sent from a client 4 via the Internet NT to the cloud print server 5. However, the invention may be applied to other systems, such as a system in which a predetermined device downloads, from a server, various content data sent from a client via the Internet NT to the server.

The above embodiment illustrates a case where the present invention is applied to the printer, but the invention may be applied to other various devices, such as a copier, a multifunction peripheral, and a facsimile machine. The invention is also applicable to various electronic devices that perform processing regarding an image, such as a computer that causes a printer to print an image, an image scanner, a facsimile machine, and a copier.

The above embodiment illustrates a case where the cloud print server 5 registers or unregisters the printer 2 by storing or deleting the identification information for the printer 2, but the cloud print server 5 may register or unregister the printer 2 by other methods, such as by updating a flag indicating whether the printer 2 is registered.

The above embodiment illustrates a case where, in response to the third transmission request, the cloud print server 5 sends a print job to the printer 2, but the cloud print server 5 may send the print job to a predetermined device (e.g., printer, computer, the client 4 that has sent the print job) other than the printer 2.

The above embodiment illustrates a case where the printer 2 has the three service modes, but the number of service modes may be one, two, four, or more.

While the preferred embodiments of the present invention have been illustrated in detail, it should be apparent that modifications and improvements may be made to the invention without departing from the spirit and scope of the invention as described in the following claims.

What is claimed is:

1. An image forming apparatus comprising:
 a communication unit that communicates with a print server, the print server providing, when the image forming apparatus is registered with the print server, a service of receiving and storing a print job for the image forming apparatus and sending the stored print job to the image forming apparatus, the communication unit receiving the print job sent from the print server;
 a printing unit that prints the print job received by the communication unit;
 a reception unit that receives an instruction to remove the registration of the image forming apparatus; and
 a controller that, when the reception unit receives the instruction, sends, via the communication unit to the print server, a request to send the print job, receives, from the print server via the communication unit, one or more print jobs for the image forming apparatus left in the print server, outputs the received one or more print jobs, and then sends, via the communication unit to the print server, a request to remove the registration of the image forming apparatus from the print server.

2. The image forming apparatus of claim 1, wherein the controller outputs the received print job by printing the received print job.

3. The image forming apparatus of claim 1, wherein after outputting the received print job, the controller sends, via the communication unit to the print server, a notification of completion of output, and then sends, via the communication unit to the print server, the request to remove the registration.

4. The image forming apparatus of claim 1, wherein when the image forming apparatus is registered with the print server, identification information for identifying the image forming apparatus is stored in the print server, and
 wherein the controller sends, as the request to remove the registration, a request to delete the identification information from the print server.

5. The image forming apparatus of claim 1, further comprising a memory that stores mode information indicating whether the image forming apparatus is registered with the print server, the mode information indicating one of a registered mode in which the image forming apparatus is registered with the print server and an unregistered mode in which the image forming apparatus is not registered with the print server,
 wherein upon receiving, from the print server via the communication unit, a notification of completion of the removal in response to the request to remove the registration, the controller updates the mode information to indicate the unregistered mode.

6. The image forming apparatus of claim 1,
 wherein the controller has a first function of, upon receiving, via the communication unit, a reception notification sent from the print server when the print server receives the print job, sending, in response to the reception notification, via the communication unit to the print server, a request to send the print job, and
 wherein when the reception unit receives the instruction, the controller:
 if the first function is disabled, sends the request to send the print job, and then sends the request to remove the registration; and
 if the first function is enabled, sends the request to remove the registration without sending the request to send the print job.

7. The image forming apparatus of claim 6, wherein the controller further has a second function of sending, in response to operation by a user, via the communication unit to the print server, a request to send the print job.

8. The image forming apparatus of claim 1, wherein the print server is a cloud print server.

9. The image forming apparatus of claim 1, wherein when the reception unit receives the instruction to remove the registration of the image forming apparatus from the print server, the controller detects whether or not the print server has a print job which has not sent to the communication unit based on a connection status between the print server and the communication unit before the controller sends the request to remove the registration.

10. An image forming apparatus, comprising:
 a communication unit that communicates with a print server, the print server providing, when the image forming apparatus is registered with the print server, a service of receiving and storing a print job for the image forming apparatus and sending the stored print job to the image forming apparatus, the communication unit receiving the print job sent from the print server;
 a printing unit that prints the print job received by the communication unit;
 a reception unit that receives an instruction to remove the registration of the image forming apparatus;
 a manager that manages first and second modes of the image forming apparatus; and
 a controller that, when the reception unit receives the instruction while the image forming apparatus is in the second mode, sends, via the communication unit to the print server, a request to send the print job, and then sends, via the communication unit to the print sever, a request to remove the registration, and that, when the reception unit receives the instruction while the image forming apparatus is in the first mode, sends, via the communication unit to the print server, the request to remove the registration without sending the request to send the print job.

11. The image forming apparatus of claim 10, further comprising a memory that stores mode information indicating which of the modes the image forming apparatus is in, the mode information indicating one of the first mode and the second mode.

12. The image forming apparatus of claim 10, wherein
 the manager further manages a third mode of the image forming apparatus, a connection status between the communication unit and the print server in the third mode being different from the connection status in the second mode, and
 when the reception unit receives the instruction while the image forming apparatus is in the third mode, the controller sends the request to send the print job, and then sends the request to remove the registration.

13. The image forming apparatus of claim 12, wherein:
 the first mode is a mode in which the controller receives, via the communication unit, a reception notification sent from the print server when the print server receives the print job, and sends, in response to the reception notification, via the communication unit to the print server, a request to send the print job;

the second mode is a mode in which the controller receives no reception notification from the print server when the print server receives the print job, but sends, in response to operation by a user, via the communication unit to the print server, a request to send the print job; and the third mode is a mode in which the controller receives no reception notification from the print server when the print server receives the print job, and sends the print server no request to send the print job.

14. The image forming apparatus of claim 12, wherein while the image forming apparatus is in the first mode, the communication unit always communicates with the print server, while the image forming apparatus is in the second mode, the communication unit communicates with the print server only when the communication unit is connected to the print server, and while the image forming apparatus is in the third mode, the communication unit does not communicate with the print server unless the mode is changed to the first or second mode in the third mode.

15. A printing method using a print server that provides, when identification information for an image forming apparatus is stored in the print server, a service of receiving and storing a print job for the image forming apparatus and sending the stored print job to the image forming apparatus, the printing method comprising:

a first step of receiving an instruction to delete the identification information for the image forming apparatus from the print server; and a second step of, when the instruction is received, sending the print server a request to send the print job, receiving a print job for the image forming apparatus left in the print server, printing the received print job, and then sending the print server a request to delete the identification information for the image forming apparatus from the print server.

16. The printing method of claim 15, further comprising:

a third step of enabling or disabling a function of, upon receiving a reception notification sent from the print server when the print server receives the print job, sending the print server a request to send the print job; and a fourth step of, when the instruction is received, sending the print server a request to delete the identification information for the image forming apparatus from the print server without sending the print server the request to send the print job, wherein when the instruction is received while the function is disabled, the second step is performed, and when the instruction is received while the function is enabled, the fourth step is performed.

17. The printing method of claim 16, further comprising a fifth step of, when the instruction is received, determining, according to whether the function is enabled or disabled, whether to perform the second step or the fourth step.

18. The printing method of claim 17, wherein the print server is a cloud print server.

19. The printing method of claim 16, wherein the print server is a cloud print server.

20. The printing method of claim 15, wherein the print server is a cloud print server.

* * * * *